TRANSISTORIZED AMPLIFIER FOR ELECTRONIC CLOCKWORK MOTOR

Filed Nov. 2, 1967 2 Sheets-Sheet 1

INVENTOR
ROBERT WALTER REICH
by Melvin A. Crosby

TRANSISTORIZED AMPLIFIER FOR ELECTRONIC CLOCKWORK MOTOR

Filed Nov. 2, 1967

INVENTOR
ROBERT WALTER REICH by Melvin A. Crosby

United States Patent Office 3,524,117
Patented Aug. 11, 1970

3,524,117
TRANSISTORIZED AMPLIFIER FOR ELECTRONIC CLOCKWORK MOTOR

Robert Walter Reich, Merzhauserstr. 143, Freiburg im Breisgau, Germany

Continuation-in-part of application Ser. No. 373,294, June 8, 1964. This application Nov. 2, 1967, Ser. No. 680,135
Int. Cl. H02k 33/02
U.S. Cl. 318—128 6 Claims

ABSTRACT OF THE DISCLOSURE

Transistorized amplifier circuit for an electronic clockwork motor in which a silicon transistor is provided with a driving coil in the collector-emitter circuit thereof in series with a battery and with exciter coil means in the base emitter circuit of the transistor and including means for amplifying the voltage induced in the exciter coil means by movement of the oscillatory member of the clockwork.

This application is a continuation-in-part of my copending application Ser. No. 373,294, filed June 8, 1964, and entitled "Transistor Circuit for the Operation of Electronic Clocks," now Pat. No. 3,356,919.

This invention relates to electronically powered clockworks in which an impulse developed in an exciter coil arrangement opens a transistor to release an impulse to a driving power arrangement whereby an oscillatory member is kept in motion. In particular, the present invention relates to battery powered transistorized electronic amplifier circuitry for use in respect of electronically driven clockworks in which an extremely strong opening pulse is supplied to the base of the transistor for positive control of the transistor.

The development of adequate exciting or opening voltage for the transistor in electronic clockworks has always been a problem, particularly with transistors of the silicon type. The voltage induced in an exciter coil by the movement of a permanent magnet thereby is ordinarily too low to open a silicon transistor.

Many devices have been proposed for developing excitation voltage from an exciter coil in response to the movement of the oscillating member, but heretofore all such devices have been quite sensitive to the voltage of the battery in the circuit and to ambient temperature because the voltage pulse developed in the exciter coil was relatively low and left little margin within which to take care of the referred to temperature and voltage variations.

Exciter coils of the nature referred to are necessarily quite small, particularly when the clockwork is employed in a watch. In order to obtain proper operating conditions, it is furthermore necessary to be certain that the voltage pulse in the exciter coil is sharp and needle-like so as to extend over only a short interval of time. If the exciter pulse extends for a substantial length of time there will be a high drain on the battery from which no useful power is gained. The short interval of time permissible for the voltage pulse from the exciter coil requires that these coils be relatively narrow in the direction of movement of the oscillatory member and, this in turn, tends to limit the exciter voltages that can be developed in the exciter coil. For silicon transistors, which have a gate voltage of about 0.6 volt and an opening voltage of about 2 to 3 volts at the base, such an arrangement would be inoperative. The voltage which is developed in an exciter coil in such an instance would not be great enough to open any known silicon transistor.

With conventional germanium transistors, a considerably lower opening voltage can be delivered to the base of the transistor, but the exciter voltage obtainable is so near the necessary opening voltage that a system embodying a germanium transistor is extremely sensitive to variations in battery voltage and temperature.

With the foregoing in mind, it will be understood that the primary objective of this invention is the provision of an arrangement in a transistorized electronic clockwork for producing such a strong exciter pulse that the system is relatively insensitive to temperature conditions and to the voltage of the battery contained in the transistorized circuit.

Still another object of this invention is the provision of an arrangement of the nature referred to in which, with relatively small exciter coil means, an extremely short duration voltage pulse can be developed in the exciter coil means but which pulse, however, has ample amplitude for opening a silicon transistor connected thereto.

The present invention thus deals with the enhancement or multiplication of the voltage pulse from the exciter coil means so that adequate transistor opening voltage is available at all times. According to one modification of the present invention, a plurality of exciter coils are connected in series and are so related to exciting magnets that only in one position of the oscillating member are the voltage pulses of the individual exciter coils additive and whereby in only this one position is there the development of the required opening voltage for the transistor.

The particular arrangement just referred to may, for example, have the magnets for the exciter coils all poled in one direction and have a further magnet for the driving coil poled in the opposite direction, and all of the exciter coils wound and connected so as to be in additive relation when the north poles pass thereby. With such an arrangement it will be obvious that it is only in one position in each 360° of swing of the oscillatory member that the conditions prevail for the development of a strong exciter pulse. Thus, in the null position of the oscillatory member the exciter pulse in such an instance would be three times that developed in each individual exciter coil. In each of the positions 90, 190 and 270° away from the null position, the exciter voltage would amount to only that developed in one exciter coil because two of the exciter coils in each case would be in opposed relation to each other.

In an arrangement of this nature utilizing a plurality of distributed exciter coils and a driver coil, any single magnet can have a polarity reversed from those of the other magnets and if this magnet pertained to a driving coil, that particular coil would be reversely wound with respect to the other exciter coils, or would be reversely connected in series therewith. In such a case there is only one position in each 360° of rotation of the oscillatory member in which all of the exciter coils have their respective pulses in additive relation. In every other position of the oscillator member in which pulses were induced in the exciter coils, the total exciter voltage developed across the serially connected exciter coils would be reduced by twice the amount of the voltage developed in an individual exciter coil.

In another form of the invention, a transformer, either of the two coil type or of an auto transformer type, can be disposed between the source of exciting impulses and the base of the transistor to be controlled. In this particular case, a single exciter coil can be employed although a plurality of exciter coils could also be employed with a transformer if so desired.

In still another modification according to this invention, the transistor is partially biased toward conduction by the battery in the transistor circuit so that the amount of exciting pulse required to open the transistor is smaller than would otherwise be the case. In this modification also a single exciter coil or a plurality thereof could be employed.

The foregoing objects and advantages of this invention, as well as still other objects and advantages thereof will become more apparent upon reference to the following specification taken in connection with the accompanying drawings in which.

Figure 1:
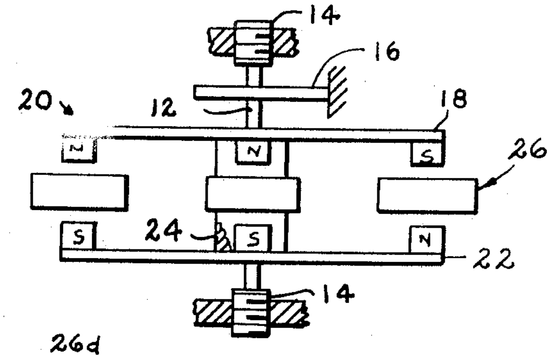
FIG. 1 shows one form which the present invention can take in side elevation.

Referring to the drawings somewhat more in detail, reference numeral 10 indicates an oscillatory member supported on a shaft 12 which is, in turn, pivotally supported in the bearings 14. A biasing spring 16 of a known type, biases the oscillatory member toward a predetermined zero or null position. The oscillatory member comprises a magnetic plate 18 having secured to one side thereof the magnets 20, while spaced from the magnets is another magnetic plate 22 providing a return path for the magnets. The shaft 12 may have a magnetic sleeve 24 extending between plates 18 and 22 so as to make the shut path more effective.

Stationarilly supported in adjacent relation to the magnet 20 is a plurality of coils generally indicated at 26.

Figure 2:
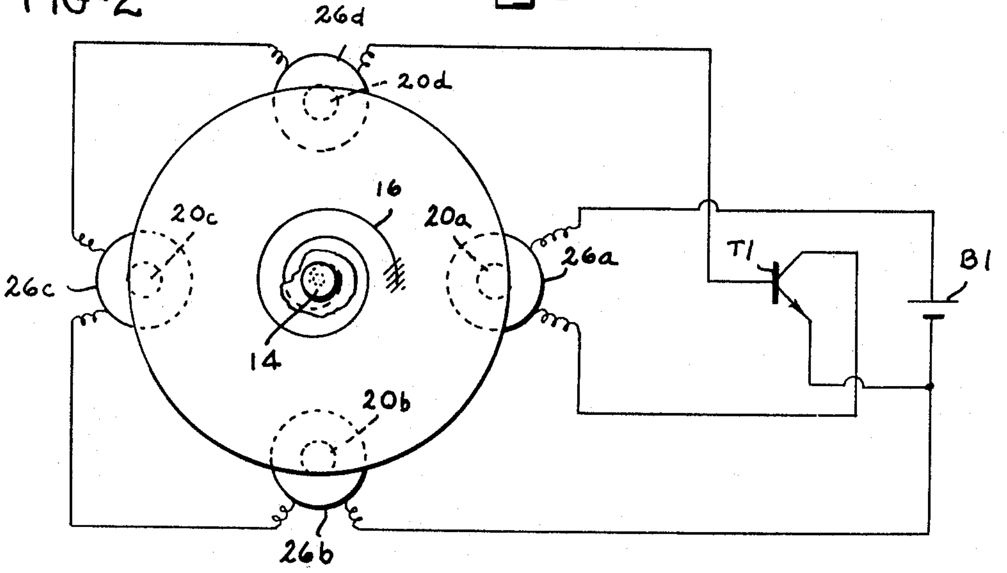
FIG. 2 shows a plan view of the FIG. 1 arrangement with the transistor and battery connected in circuit with the exciter and driver coil of the motor.

As will be seen in FIG. 2, the magnets generally indicated at 20 in FIG. 1 comprise a magnet **20*a* poled so as to present its south pole to its pertaining coil 26*a*, a magnet 20*b* poled so as to present its north pole to its pertaining coil 26*b*, a magnet 20*c* poled so as to present its north pole to its coil 26*c*, and a magnet 20*d* poled so as to present its north pole to its coil 26*d*. Coil 26*a* in the arrangement illustrated is the driver coil, and coils 26*b*, 26*c* and 26*d* are the exciter coils. As will be seen in FIG. 2, the driver coil 26*a* is connected in the collector-emitter of a transistor T1 in series with a battery B1. The exciter coils 26*b*, 26*c* and 26*d*, on the other hand, are serially connected in the base emitter circuits of transistor T1. As oscillatory member 10 oscillates, it will induce voltage pulses in the exciter coils which will cause the transistor T to open and to supply a driving pulse to the driver coil 26*a***, as is well known in the art of transistorized clockworks.

Figure 3:
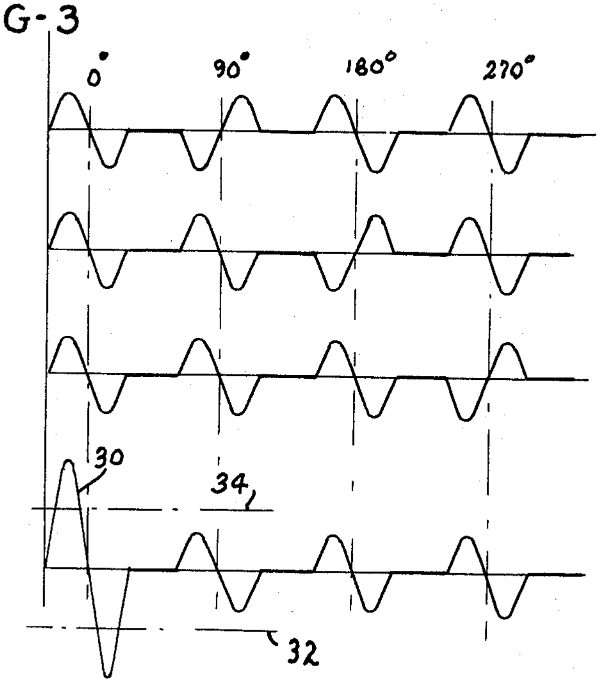
FIG. 3 is a somewhat schematic view showing how the exciter pulses combine with each other.

Referring now to FIG. 3, the nature of the invention disclosed in FIGS. 1 and 2 will be more fully appreciated. In FIG. 3, a plurality of voltage graphs are illustrated. The graph 1 at the top pertains to exciter coil **26*b*. Assuming that the oscillatory member is moving in the direction of the arrow 28, and that the vertical dash line marked O indicates the position of the oscillatory member in which it is shown in FIG. 2, the voltage pulses induced in coil 26*b* will be illustrated by the waves shown in graph I. The first wave consists of a positive half pulse of current induced in coil 26*b* when magnet 20*b* enters the coil followed by a negative half pulse of current induced in coil 26*b* as magnet 20*b* leaves the coil. Ninety degrees later, magnet 20*a* becomes effective and will first induce a negative half wave of voltage in coil 26*b* followed by a positive half wave. This is indicated in the graph at the dash line marked 90°. After magnet 20*a* leaves coil 26*b*, the next two following magnets 20*d* and 20*c* which will influence the coil, will be the same as the original magnet 20*b*** so that the voltage pulses along the lines marked 180° and 270° are the same as the first one referred to.

In a similar manner, the voltage pulses that will be induced in coil **26*c*, are shown by the line II in the graph, while those induced in coil 26*d* are shown by the line III. The combined voltages across the serially connected exciter coils is shown by the line marked IV in the graph. It will be seen that only in the null position of the oscillatory member do the voltages of the several exciter pulses add up as shown by the triple strength wave indicated by reference numeral 30**. All of the other waves of voltage as measured across the serially connected exciter coils are equivalent to the voltage across only one exciter coil because at least two of the exciter coils are always in opposing relation. Normally, the amount of swing of an oscillatory member in a clockwork is only about 100 to 150° on each side of the null position so that there is no opportunity for the conditions which exist in the null position to be duplicated in any other position of the oscillatory member.

If the transistor T1 is of the PNP type, it may open at a voltage indicated by dash line 32 which, it will be seen, is in excess of the voltage developed in the exciter coil combination in every position except in the null position. If the transistor is of the NPN type, it might open at a corresponding voltage of opposite polarity, as indicated by line 34 in FIG. 3.

In the arrangement of FIGS. 1 and 2, all of the exciter coils 26*b*, 26*c* and 26*d* are wound in the same direction, or at any rate, are connected so that the voltage pulses developed thereacross are additive when the oscillatory member is passing through its null position. The magnets which influence the exciter coils when the oscillatory member is in its null position also have the same polarity presented to their respective exciter coil. It is possible, however, for one of the magnets pertaining to the exciter coils to be poled in the opposite direction in which case that particular exciter coil would either be reversed or would be reversely connected to the other exciter coils.

Figure 4:
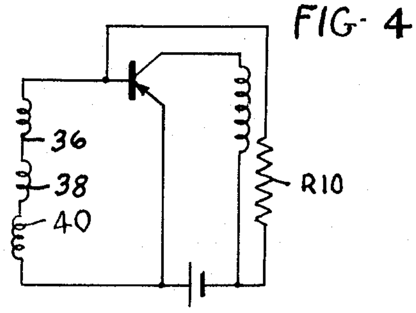
FIG. 4 is a schematic view showing a different manner of interconnecting the exciter coils for a different magnet arrangement.

In FIG. 4, exciter coils 36 and 38 are wound in the same direction and are additively connected, whereas coil 40 is reversely wound so that the magnet pertaining to coil 40 would be reversed from those pertaining to coils 36 and 38. Resistor R10 is connected between the base of the transistor and the negative side of the battery and maintains a predetermined bias on the transistor.

Figure 5:
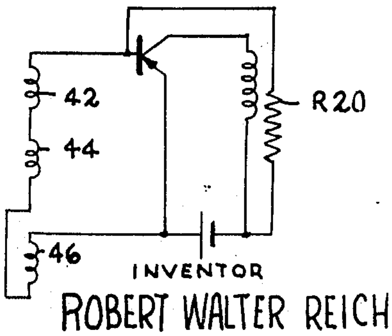
FIG. 5 is a view like FIG. 4, but shows the one exciter coil connected reversely instead of being wound reversely as in the case of FIG. 4.

In FIG. 5, coils 42 and 44 are wound in the same direction, and coil 46 is wound in the same direction but is reversely connected in the circuits. In this case, the magnet pertaining to coil 46 would also be reversed from that pertaining to coils 42 and 44. Resistor R20 is connected between the base of the transistor and the negative side of the battery and maintains a predetermined bias on the transistor.

All of the modifications of FIGS. 1 through 5 would have the same voltage graph pertaining thereto, and would operate in the same manner.

Figure 6:
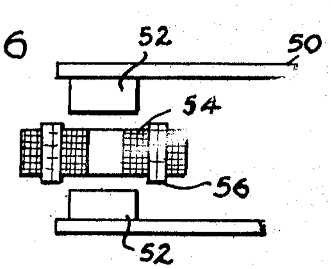
FIG. 6 is a fragmentary view showing how the exciter coil can be constructed as a transformer.
Figure 7:
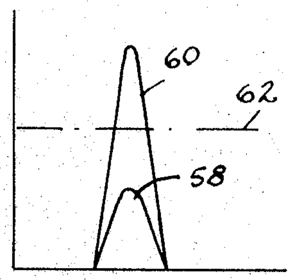
FIG. 7 shows how the transformer construction of the exciter coil of FIG. 6 produces a strong transistor opening pulse from a much smaller pulse developed in the exciter coil.

In FIG. 6, the oscillatory member 50 carries magnet means 52 which cooperates with a driver coil 54 which is coaxially surrounded by a transformer type exciter coil 56. The exciter coil 56 has induced therein a voltage pulse of the nature indicated at 58 in FIG. 7. Due to the transformer action, the pulse delivered to the base of the transistor is that indicated at 60 in FIG. 7. It will be noted that whereas voltage pulse 58 is less than the opening voltage of the transistor, indicated by dash line 62, voltage pulse 60 is well in excess of that required to open the transistor.

Figure 8:
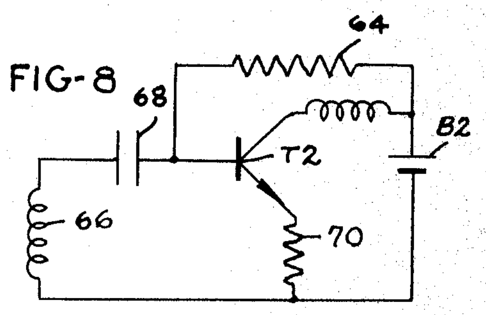
FIG. 8 shows a modification in which the transistor is partially biased toward opening by the battery in the transistorized circuit so that when a relatively small exciter pulse is superposed on the battery bias, the transistor will become conductive.

In FIG. 8 a resistor 64 is connected between the terminal of battery B2 at the base of transistor T2 and thereby biases the transistor partially toward conduction. The exciter coil in FIG. 8 is indicated at 66 and it is connected with the base of transistor T2 via a condenser 68. A current limiting resistor 70 is included in the emitter-collector circuit of the transistor. The transistor can be either a PNP or an NPN transistor.

Figure 9:
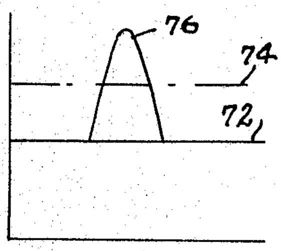
FIG. 9 is a graph showing how the battery bias and the pulse from the exciter coil combine to develop opening voltage at the base of the transistor.

As will be seen in FIG. 9, battery B2 imposes a bias indicated by line 72 on the base of the transistor which is, however, somewhat less than the opening voltage of the transistor, indicated by line 74 in FIG. 9. The pulse of voltage developed in exciter coil 66 is indicated by line 76 and it will be seen that this voltage, when superimposed on the battery bias voltage provides ample voltage for opening the transistor.

Figure 10:
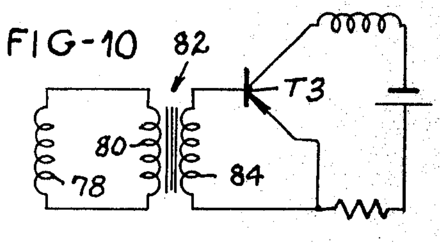
FIG. 10 shows a modification wherein a transformer having a primary and a secondary is interposed between the exciter coil and the base emitter circuit of the transistor.
Figure 11:
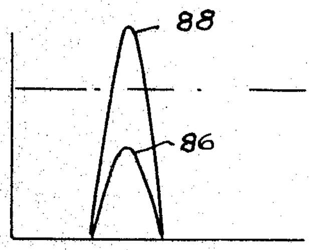
FIG. 11 shows the relationship between the voltage pulse induced in the exciter coil and the voltage pulse developed in the secondary of the transformer of FIG. 10.

In FIG. 10, exciter coil 78 is connected in closed circuit with primary 80 of a transformer 82 which has a secondary 84 that is connected in the base emitter circuit of transistor T3. Transformer 82 is a step-up transformer and, as will be seen in FIG. 11, the voltage pulse induced in exciter coil 78 is indicated by line 86, whereas the output from the secondary 84 of the transformer is indicated by line 88. It will be apparent that a substantial amplification of the voltage of the induced pulse is obtained in this manner.

Figure 12:
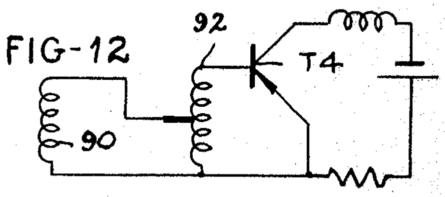
FIG. 12 shows a modification wherein the transformer is an auto transformer.

In FIG. 12 exciter coil 90 is connected to auto transformer 92 so that an amplified pulse will be supplied to the base of the transistor T4. The same voltage graph that obtained for FIG. 10 will obtain for FIG. 12, namely the voltage graph of FIG. 11.

Figure 14:
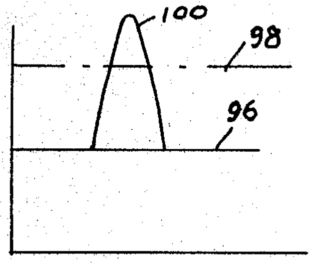
FIG. 14 shows how a relatively small voltage pulse induced in the exciter coil will superimpose upon the bias on the base provided by the battery and open the transistor.
Figure 13:
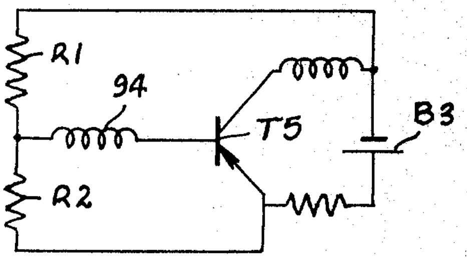
FIG. 13 shows another arrangement wherein the battery in the circuit provides preliminary or partial bias to the base of the transistor.

In FIG. 13, there is shown an arrangement in which a battery B3 is connected with one end of exciter coil 94 via resistors R1 and R2 so that a predetermined bias is maintained on the base of transistor T5 which bias, however, is not sufficient for opening the transistor. This bias from the battery is indicated by line 96 in FIG. 14, and wherein the voltage required to open the transistor is indicated by line 98. The pulse induced in excited coil 94 is indicated by line 100 which, it will be seen, when superimposed on bias voltage 96 is ample for opening the transistor.

In every case described above, an arrangement has been provided whereby the voltage pulse delivered to the base of a transistor, especially a silicon transistor, for opening the same, is substantially augmented over what the pulse would be if a single exciter coil were to be connected in the base emitter circuit of the transistor. The augmentation of the voltage pulse delivered to the base of the transistor is obtained by employing a plurality of exciter coils and arranging these coils so that voltage pulses therein will be additive only in one position of the oscillatory member, by transformer action, or by providing an additional bias to the base of the transistor so that the voltage pulse induced in the exciter coil will carry the base bias well into the conduction region.

The amplifier circuits are substantially insensitive to temperature and voltage variations.

It will be understood that this invention is susceptible to modification in order to adapt it to different usages and conditions and, accordingly, it is desired to comprehend such modifications within this invention as may fall within the scope of the appended claims.

I claim:

1. In a transistorized amplifier circuit for a clockwork motor having an oscillatory member biased toward a null position and having magnet means thereon; a transistor, a driving coil in the collector-emitter circuit of the transistor and a battery in series therewith, exciter coil means in the base-emitter circuit of the transistor operable when excited to develop a voltage pulse in said base-emitter circuit to cause said transistor to conduct, said magnet means cooperating with said exciter coil means for exciting said exciter coil means to induce a voltage pulse therein during movement of said oscillatory member and also cooperating with said driving coil to develop a drive impulse on said oscillatory member when the transistor conducts to maintain said oscillatory member in motion, said exciter coil means comprising a plurality of exciter coils connected in series between the base and the emitter of said transistor, said exciter coils and said driving coil being circumferentially spaced with respect to said oscillatory member, said magnet means comprising an individual magnet for each said coil, one of said magnets being poled in one direction and the others thereof being poled in the opposite direction, said exciter coils being so connected that the individual voltage pulses induced therein by the respective magnets are additive across the serial arrangement of the exciter coils only in the null position of said oscillatory member, said one magnet pertaining to one of said exciter coils.

2. A transistorized amplifier circuit according to claim 1 which includes a step-up transformer having its primary side connected in closed circuit with the said exciter coil means to receive the voltage pulse therefrom, and the secondary side of said transformer being connected in the base-emitter circuit of said transistor.

3. A transistorized amplifier circuit according to claim 1 which includes an auto transformer having a coil of which a portion is connected across the exciter coil means while the entire coil is disposed in the base-emitter circuit of the transistor.

4. A transistorized amplifier circuit according to claim 1 which includes a voltage divider having one end connected to one pole of said battery and the other end connected to the emitter of said transistor, and said exciter coil means having one side connected to a point on said voltage divider and the other side connected to the base of said transistor whereby the battery supplies a bias to the base of the transistor in the opening direction but insufficient to open the transistor.

5. A transistorized amplifier circuit according to claim 1 which includes a resistor connected between the base of the transistor and one pole of the battery to supply a bias to the transistor base in the opening direction but insufficient to open the transistor, and a condenser in series with said exciter coil means in the base-emitter circuit of the transistor.

6. A transistorized amplifier circuit according to claim 1 which includes an auto transformer having a single coil, the said single coil of said auto transformer being connected to the base-emitter circuit of said transistor while a portion of said single coil comprises at least a part of said exciter coil means.

References Cited

UNITED STATES PATENTS

| | | | |
|---|---|---|---|
| 2,769,946 | 11/1956 | Brailsford | 318—128 |
| 2,831,114 | 4/1958 | Van Overbeek | 318—132 X |
| 2,895,095 | 7/1959 | Guyton | 318—132 X |
| 3,123,755 | 3/1964 | Braithwaite et al. | 318—132 |
| 3,356,919 | 12/1967 | Reich | 318—132 X |

FOREIGN PATENTS

| | | |
|---|---|---|
| 252,130 | 2/1967 | Austria. |
| 353,691 | 5/1961 | Switzerland. |

DONOVAN F. DUGGAN, Primary Examiner

U.S. Cl. X.R.

318—132